United States Patent
Martin et al.

(10) Patent No.: US 7,671,720 B1
(45) Date of Patent: Mar. 2, 2010

(54) METHOD AND APPRATUS FOR REMOVING DISTORTION IN RADIO FREQUENCY SIGNALS

(75) Inventors: Robert Martin, San Jose, CA (US); Donald Speirs, Placitus, NM (US); Gregory P. Katterhagen, Gilroy, CA (US)

(73) Assignee: Alien Technology Corporation, Morgan Hill, CA (US)

( * ) Notice: Subject to any disclaimer, the term of this patent is extended or adjusted under 35 U.S.C. 154(b) by 582 days.

(21) Appl. No.: 10/932,684

(22) Filed: Sep. 1, 2004

(51) Int. Cl.
*H04Q 9/00* (2006.01)

(52) U.S. Cl. .................. 340/10.1; 340/572.1; 340/572.4

(58) Field of Classification Search ................. 340/10.1, 340/10.3, 572.1, 572.4
See application file for complete search history.

(56) References Cited

U.S. PATENT DOCUMENTS

| | | | | |
|---|---|---|---|---|
| 3,984,835 A | * | 10/1976 | Kaplan et al. ................. | 342/44 |
| 4,075,632 A | * | 2/1978 | Baldwin et al. ............... | 342/51 |
| 4,556,883 A | * | 12/1985 | Strietzel .................... | 340/10.4 |
| 5,691,978 A | * | 11/1997 | Kenworthy .................. | 370/278 |
| 6,192,222 B1 | * | 2/2001 | Greeff et al. ................. | 455/106 |
| 6,229,992 B1 | * | 5/2001 | McGeehan et al. ............ | 455/78 |
| 6,510,308 B1 | * | 1/2003 | Thomas et al. ............. | 455/63.1 |
| 7,215,249 B2 | | 5/2007 | Carrender et al. | |
| 2005/0207509 A1 | * | 9/2005 | Saunders et al. ............ | 375/285 |
| 2006/0098765 A1 | | 5/2006 | Thomas et al. | |

* cited by examiner

*Primary Examiner*—Edwin C Holloway, III
(74) *Attorney, Agent, or Firm*—Blakely, Sokoloff, Taylor & Zafman LLP (57) ABSTRACT

According to several embodiments of the invention, a radio frequency identification (RFID) interrogator utilizing a circuit to remove unwanted distortion from a received signal is described. The interrogator transmits a transmitted signal continuously, while receiving a received signal from a radio frequency identification (RFID) tags. The circuit samples the transmitted signal, and removes the unwanted distortion created by the transmitted signal from the received signal.

30 Claims, 7 Drawing Sheets

METHOD AND APPRATUS FOR REMOVING DISTORTION IN RADIO FREQUENCY SIGNALS

FIELD

The invention relates generally to radio frequency identification (RFID) systems, and specifically to techniques for removing distortion from signals received from RFID tags.

BACKGROUND

RFID systems can be used to track and identify items. An RFID tag is a small electronic device that can be attached to an item, and can be coded with data identifying the item. An RFID interrogator reads the tags to identify the items. The RFID interrogator includes a transmitter to generate a transmitted signal used to search for the RFID tags, a receiver to receive backscattered signals from the RFID tags, and a decoder to decode the back scattered signals. The RFID tags receive an encoded transmitted signal from the interrogator, alter the signal, and return the signal to the interrogator via the principal of backscatter. The interrogator then receives the returned and altered signal and decodes it, thus identifying the item to which the tag is attached or associated with.

Passive RFID tags have no internal power source and use the energy of the interrogator's transmitted signal to power the tag. The transmitted signal is orders of magnitude stronger than the received signal being backscattered by the RFID tag. For example, the signal transmitted by the interrogator may have 1 Watt of power, while the received back scattered signal from the tag may have only 1 milliwatt (mW) of power or less. Since the interrogator is constantly powering the RFID tags in its vicinity, the interrogator's transmitter is always transmitting while the interrogator's receiver is simultaneously receiving the back scattered information from the tag. As a result of the interrogator's transmitter continuous operation, there are sources of transmitter energy that may leak into the receiver portion of the interrogator and distort the desired backscatter from the tag in the interrogator's receiver, which can cause the RFID tag to be misread or misidentified by the interrogator.

For example, an RFID interrogator may include a single antenna to simultaneously receive from and transmit signals to tags. The antenna is connected to a combiner. The combiner is a unidirectional device that routes signals from the interrogator's transmitter to the antenna only in one direction, and routes backscatter signals from tags through the antenna to the interrogator receiver in one direction only. Ideally, in the transmit direction, the combiner only transmits RF energy to the antenna, and RF energy coming from tag backscatter into the antenna will only be directed to the interrogator receiver. The combiner is not a perfect device, however, and transmitted RF energy will leak into the receiver, introducing distortion onto the received signal. This distortion can cause misidentification of the RFID tags. Therefore, what is needed is a way to remove the distortion introduced by the transmitted signal.

SUMMARY OF THE DESCRIPTION

According to several embodiments of the invention, a radio frequency identification (RFID) interrogator utilizing a circuit to remove unwanted distortion from a received signal is described. The interrogator transmits a transmitted signal continuously, while receiving backscatter signals from a radio frequency identification (RFID) tag. The circuit samples the transmitted signal, modifies the RF energy, and introduces the modified energy back into the interrogators receiver that then nulls or cancels the unwanted distortion.

BRIEF DESCRIPTION OF THE DRAWINGS

The invention may be best understood by referring to the following description and accompanying drawings that are used to illustrate embodiments of the invention. In the drawings.

DETAILED DESCRIPTION

Described herein are methods and apparatuses for removing distortion in radio frequency (RF) signals. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to an embodiment of the invention, a transmitted signal generated by an interrogator is sampled and modified, and then added to the received signal to cancel distortion caused by the transmitted signal. A signal tap or directional coupler may be connected to the signal line connected to an output of a transmitter to sample the transmitted signal. A resulting sampled signal is then phase shifted and amplified so that when it is combined with the received signal, a resulting modified signal will cancel distortion from the received signal. For example, the sampled signal can be shifted 180 degrees out of phase and have its amplitude modified such that a distorted portion of the received signal will cancel out. According to another embodiment, the interrogator may include a feedback system so that the amplitude and phase of the modified signal can be changed and the degree of success in canceling the distortion can be measured and used to control the process through use of a software algorithm.

Figure 1:
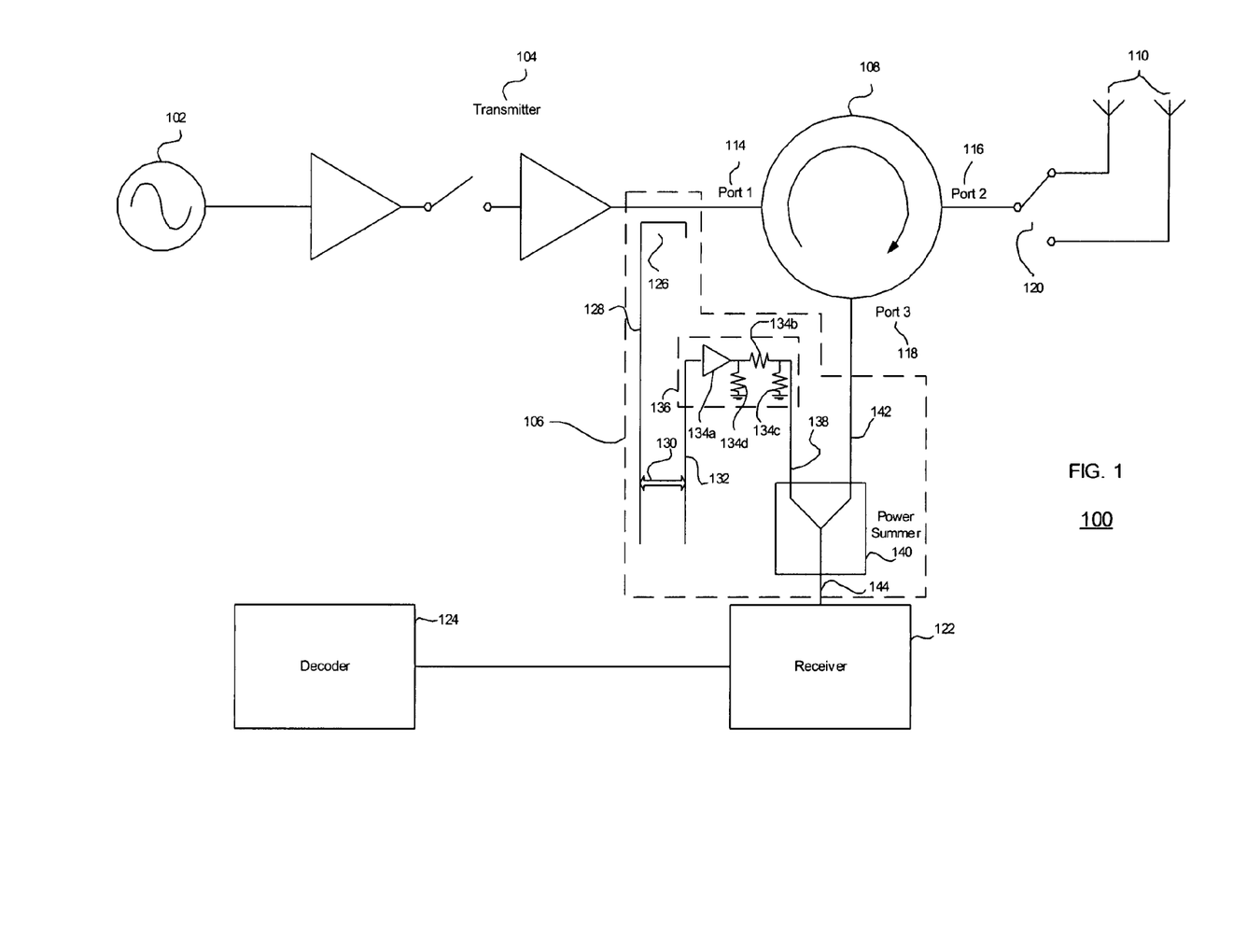
FIG. 1 illustrates an interrogator according to a first embodiment of the invention including a feedback circuit to remove distortion from a received signal utilizing a static adjustment to null the distortion.

FIG. 1 illustrates an interrogator 100 according to a first embodiment of the invention including a static adjustment of the feedback phase and amplitude of the sampled signal. To describe the process, several different signal processes are discussed below. The "transmitted signal" is a signal generated by the interrogator 100 used to search for RFID tags. The "received signal" is the signal generated or backscattered by an RFID tag and received by the interrogator, 100, that then is decoded to identify a unique RFID tag. A "sampled signal" is a signal identical to the transmitted signal except that it has a smaller amplitude than the transmitted signal. The sampled signal is generated by coupling into the signal line carrying the transmitted signal, extracting a small percentage of energy from the transmitted signal. The sampled signal has the same phase and frequency as the transmitted signal. A "phase shifted signal" results when the sampled signal has been phase shifted. A "modified signal" is generated by amplifying the phase shifted signal. The sampled signal is modified so that when the modified signal is added to the received signal, the distortion is canceled or nulled from the received signal. A "summed signal" is generated by adding the modified signal to the received signal. The summed signal is the received signal without the distortion created by the transmitted signal.

The interrogator 100 includes an oscillator 102 providing input to a transmitter 104. The transmitter 104 generates the transmitted signal that is sent to the RFID tag. According to one embodiment of the invention, the transmitted signal is an On/Off keyed continuous wave (CW) signal. In other words, the transmitter 104 is constantly on or being modulated, always supplying power to RFID tags through the RF fields being generated from the transmitter and antenna.

A circuit 106 is used to remove the distortion from the received signal. The circuit 106 samples the transmitted signal, modifies the sampled signal, and adds the modified signal to the received signal. The circuit 106 has static phase shift and amplification circuits to remove a predetermined distortion from the received signal. Feedback circuits that can change the amount of phase shifting and amplification in real time (dynamic) are described in other embodiments of the invention.

The transmitted signal is inputted into a circulator 108, which is connected to one or more antennas 110. The circulator 108 is a unidirectional pathway for radio frequency (RF) energy. The circulator 108 is a type of combiner. The energy in the circulator 108 ideally follows the arrow 112. For example, the transmitted signal generated by the transmitter 104 ideally travels from a port 1 114 to a port 2 116 which is connected to the antenna 110. The RFID tag modifies, or backscatters, the transmitted signal and returns the modified signal to the interrogator 100. This received signal is ideally captured by the antenna 108 and enters the port 2 116 and travels through to a port 3 118 which is connected to a receiver 122 and a decoder 124. However, the circulator 106 is not a perfect device, and energy traveling from port 1 114 to port 2 116 typically leaks through to port 3 118 creating distortion in the received signal.

The circulator 108 is a type of combiner. Several different types of combiners may be used with the interrogator 100, and will be described as further embodiments of the invention. Further, although two antennas 110 are shown, it is understood that any number of antennas may be used. When using two or more antennas 110, a switch 120 is used to switch between the two antennas 110. A single antenna may be used to both receive and transmit RF energy, and the circulator 108 will direct the received energy toward port 3 118 and direct transmitted energy from the transmitter 104 at port 1 114 to the port 2 116 and eventually to antenna 110. In order to constantly interrogate RFID tags, the interrogator 100 provides a continuous wave (CW) signal, so that even when the interrogator 100 is receiving signals from one or more intercepted RFID tags, the interrogator 100 can continues to transmit RF energy to power the RFID tags in its vicinity. The circulator 108 is used to direct the energy to its proper outlet.

The receiver 122 receives signals from the RFID tags through the antennas 110 and the circulator 108. The receiver 122 demodulates the received signals and presents them to a decoder 124, which is a logic device for decoding the demodulated signals. The decoder 124 decodes the signals and determines an identity of the RFID tag backscattering the signals, and may then transmit the identity to another device (e.g., a computer system) through a communication link.

The circuit 106, which is used to remove the distortion from the received signal, includes several electronic components. A coupler 126 taps the transmitted signal generated by the transmitter 104. The coupler 126 samples a small portion of the transmitted signal, creating the sampled signal on the line 128. A transmission line 130 receives the sampled signal from the line 128. The transmission line 130 can be preset to a specified length, or phase, when the interrogator 100 is required to shift the phase of a specific signal. For example, the transmission line 130 may be a length of transmission line that shifts the sampled signal 180 degrees relative to the transmitted signal so that the distortion in the received signal is cancelled when the sampled signal is added to the received signal. The transmission line 130 outputs a phase shifted signal on a signal line 132.

A static amplifier 134a and three resistors 134b, 134c, and 134d, which comprise a fixed attenuator 136, amplifies the phase shifted signal received on the signal line 132. The amplitude of the modified signal should be equal in amplitude and opposite in phase of the distorted portion of the received signal, so that when the modified signal is added to the received signal, the distorted portion of the received signal is cancelled. The amplification can be changed by changing the values of the resistors 134b-d or by changing the gain of the static amplifier 134a.

After being amplified, the modified signal travels along a signal line 138 into a power summer 140. The power summer 140 may be, for example, a device commonly referred to as a Wilkinson power combiner. The power summer 140 adds the modified signal to the received signal traveling down a signal line 142. The power summer 140 adds the two signals together so that the summed signal, which is outputted at a signal line 144, is free of distortion. The modified signal is complementary to the distortion that is present in the received signal. By adding the complementary modified signal to the received signal, the distortion in the received signal is minimized, and the summed signal is free of the distortion.

The first embodiment of the invention described in FIG. 1 can modify a received signal so that the undesired transmitted leakage signal is cancelled. However, the characteristics of the transmitted signal must be known ahead of time, and the transmission line 130 and the variable attenuator 136 are preset for those characteristics to achieve a 180 degree phase shift and establish an equal amplitude to that of the undesired distortion signal. The characteristics of the interrogators transmission signal may change over time and frequency, and the characteristics of the circulator 108 may also change over time. Therefore, it may be advantageous to add a dynamic feedback circuit to the interrogator 100.

Figure 2:
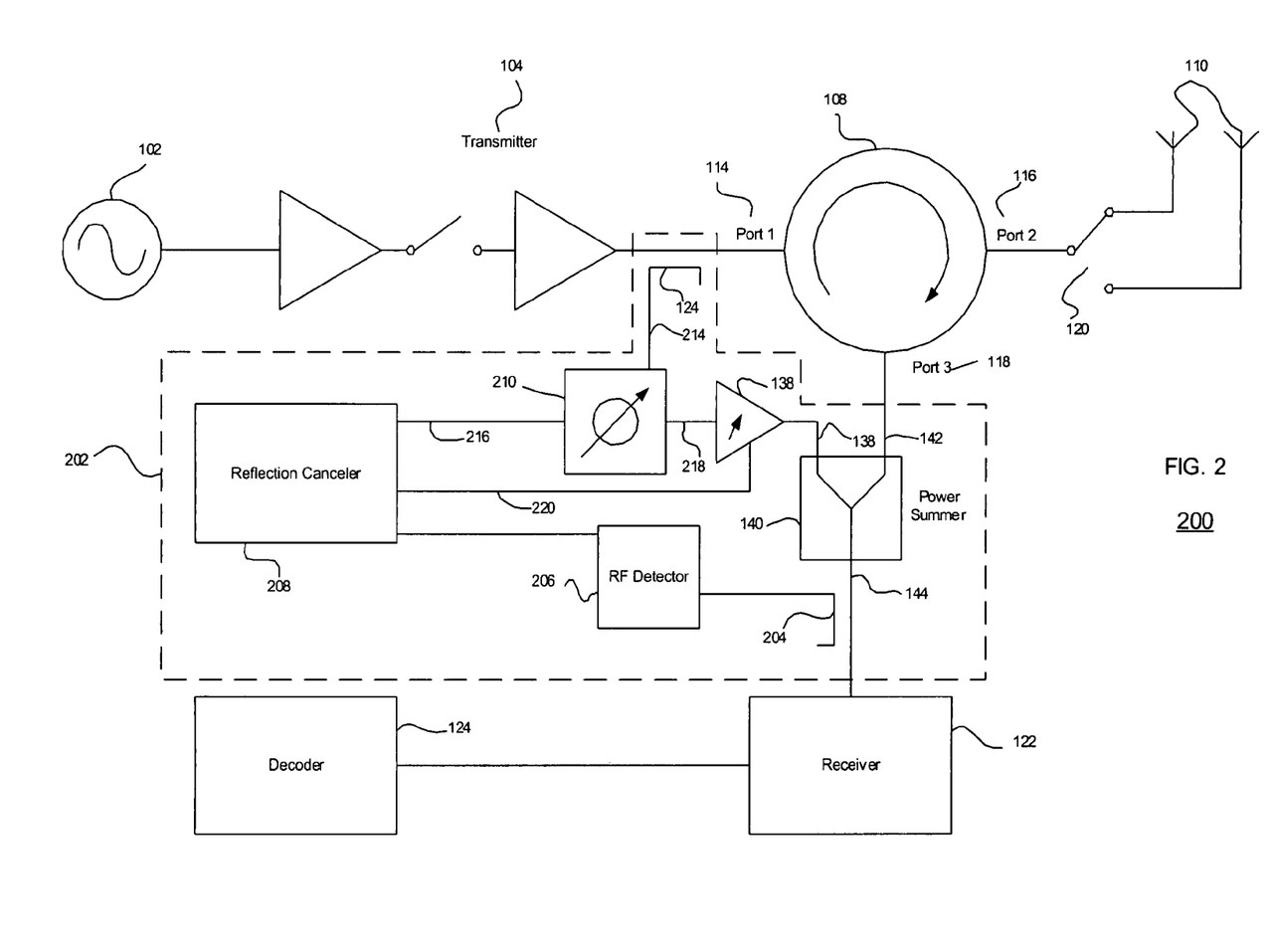
FIG. 2 illustrates an interrogator including a dynamic feedback circuit to remove distortion from a received signal according to a second embodiment of the invention.

FIG. 2 illustrates an interrogator 200 including a dynamic feedback circuit 202 to remove distortion from a received signal according to a second embodiment of the invention. A dynamic feedback circuit 202 is added to the interrogator 200 to cancel the distortion from the received signal. The circuit 202 includes a coupler 124 to sample the transmitted signal. The circuit 202 also includes a second coupler 204 to sample the summed signal on the signal line 144. The circuit 202 can determine its effectiveness using a feedback algorithm, and alter the phase shift and the amplification of the sampled signal if necessary to achieve a null of the distortion on the received signal.

An RF detector 206 is connected to the coupler 204 and outputs a DC voltage reflecting the effectiveness of the distortion signal cancellation. The RF detector 206 outputs this voltage to a reflection canceller 208, which calculates any signal change needed to minimize or null the distortion. The reflection canceller 208 is a logic circuit that determines the amount that the sampled signal should be phase shifted, as well as the amount of amplification needed. The reflection canceller bases this determination on the input from the RF detector 206. For example, if no distortion is found, the RF detector may output a low (near zero) voltage, and the reflection canceller 208 will not change the phase shift and amplification characteristics of the circuit 202. If there is distortion found, the RF detector may output a higher voltage (greater than zero), and the reflection canceller can use this voltage to determine the necessary phase shift and amplification. The reflection canceller can then control a variable phase shift element 210 and a voltage controlled gain amplifier 212 that modify the phase and the amplification of the sampled signal, respectively. The reflection canceller 208 may use look-up tables to determine appropriate phase shifts and amplification based on the output of the RF detector 206 or other control loop algorithms.

The sampled signal from the coupler 124 is inputted into the variable phase shift element 210 on the signal line 214. The variable phase shift 210 element includes an input line 216 from the reflection canceller 208. The input line 216 indicates to the variable phase shift element 210 the amount of phase shift that should be incorporated into the sampled signal. A phase-shifted signal is outputted on the line 218 into the voltage controlled gain amplifier 212. The voltage controlled gain amplifier 212 also includes an input line 220 from the reflection canceller 208. The voltage controlled gain amplifier 212 modifies the amplitude of the phase-shifted signal from the signal line 218 based on the input from the reflection canceller 208 on the line 220. The modified signal outputted on the signal line 138 is inputted into the power summer 140. The power summer 140 adds the modified signal on the signal line 138 and the received signal on the signal line 142, and outputs the summed signal on the signal line 144. The summed signal on line 138 is then sampled by the coupler 204, so that the feedback circuit 202 can continuously adjust the required modification of the sampled signal. The summed signal is also inputted into the receiver 122, which demodulates and transmits the summed signal to the decoder 124, which determines the identity of the RFID tag.

Figure 3:
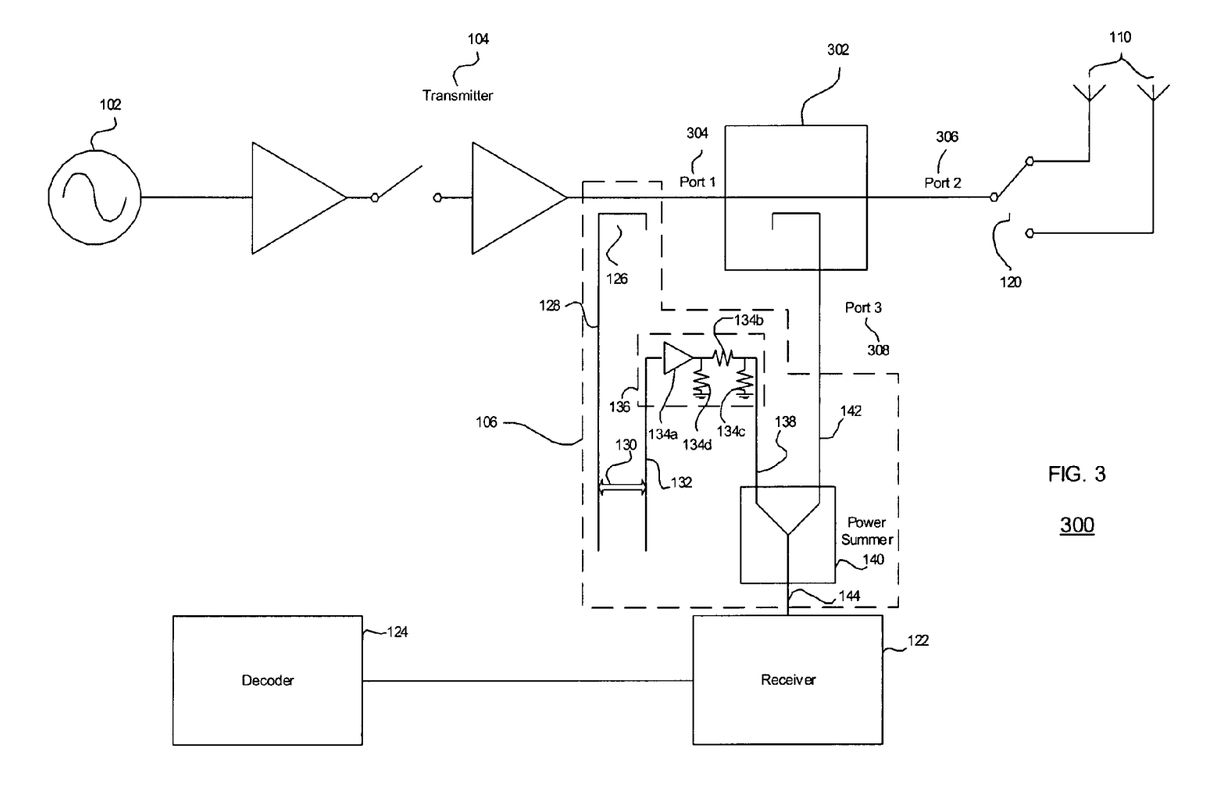
FIG. 3 illustrates an interrogator using a static adjustment of the feedback signal to null the distortion.

FIG. 3 illustrates an interrogator 300 using a static phase shift, static gain and a directional coupler according to a third embodiment of the invention. The interrogator 300 includes the same components of interrogator 100 except for the circulator 106, which is replaced by a directional coupler 302. The directional coupler 302, like the circulator 106, includes three ports, port 1 304, port 2 306, and port 3 308. Also like the circulator 106, the directional coupler 302 is a unidirectional device, which directs the inputted transmitted signal at port 1 304 to the antenna port 2 306, and directs the received signal from the port 2 306 to the port 3 308. The interrogator 300 includes the fixed phase shift and fixed gain circuit 106 to generate the modified signal, which is added to the received signal in the power summer 140. The interrogator 300 otherwise operates similarly to the interrogator 100 described regarding FIG. 1.

Figure 4:
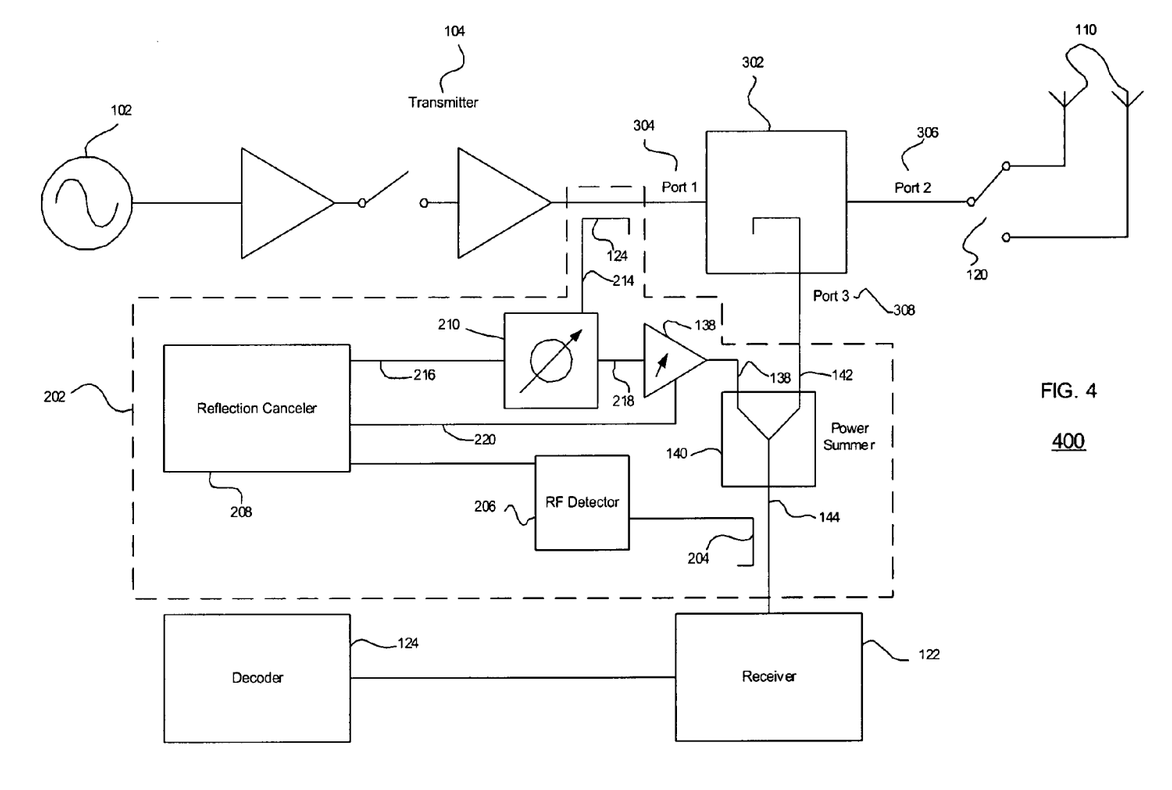
FIG. 4 illustrates an interrogator using a directional coupler and a dynamic feedback circuit to remove distortion from the received signal according to a fourth embodiment of the invention.

FIG. 4 illustrates an interrogator 400 using a directional coupler 302 and a feedback circuit 202 to remove distortion from the received signal according to a fourth embodiment of the invention. The interrogator 400 includes the feedback circuit 202 like the interrogator 200 described in FIG. 2. However, instead of using a circulator 106, the interrogator 400 uses a directional coupler 302. As mentioned above, the directional coupler 302 is a unidirectional device that receives a transmitted signal from the transmitter 104, which is outputted at the antenna 108. The directional coupler 302 also receives a received signal from the antenna 108 of port 2 306, which is transmitted to port 3 308. Otherwise, the interrogator 400 is functionally similar to the interrogator 200 described above regarding FIG. 2.

Figure 5:
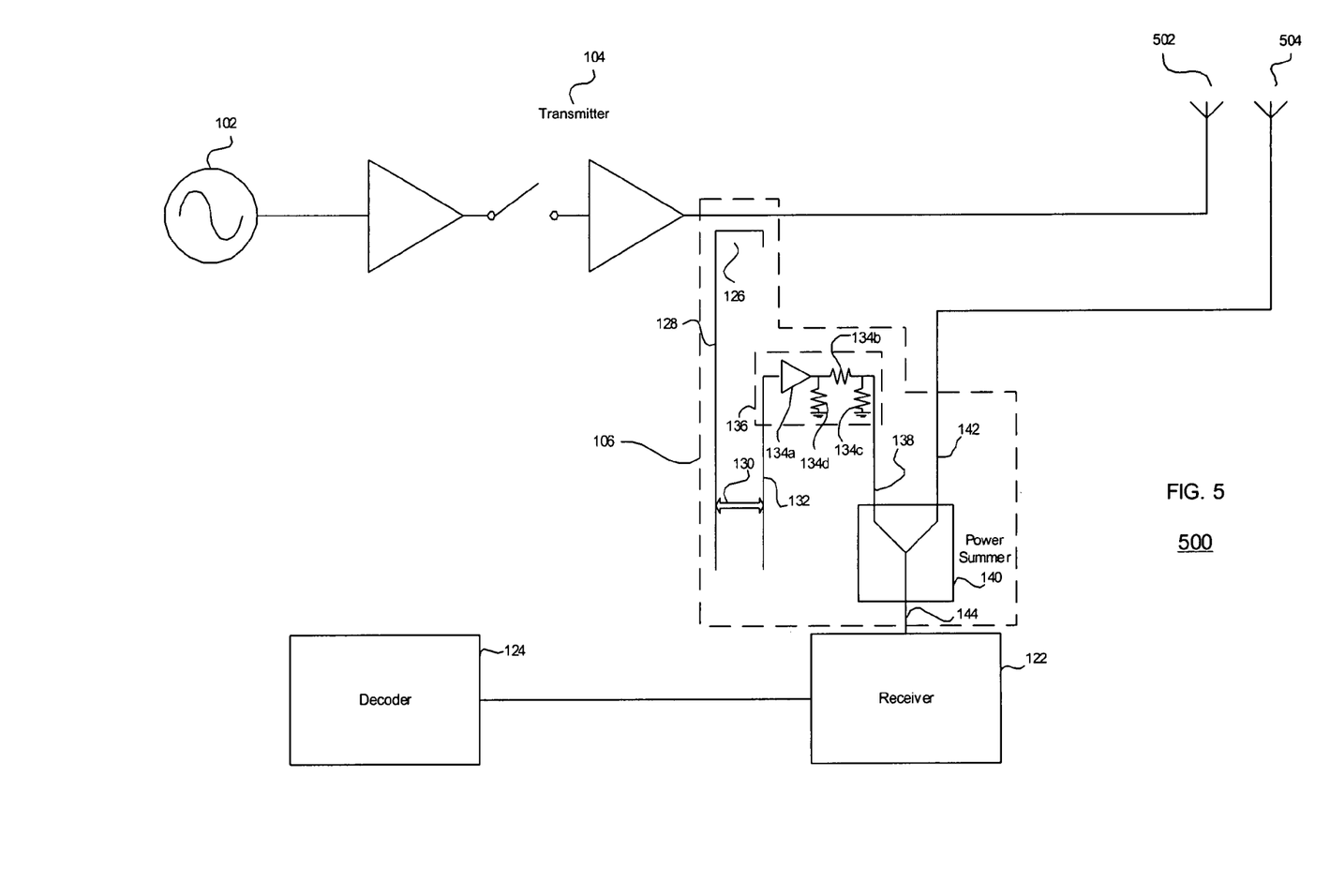
FIG. 5 illustrates an interrogator using separate transmission and reception antennas and a static adjustment of feedback signal to null the distortion according to a fifth embodiment of the invention.

FIG. 5 illustrates an interrogator 500 using separate transmission and reception antennas and a fixed phase shift circuit 106 according to a fifth embodiment of the invention. The interrogator 500 uses similar components to the interrogators 100 and 300, except that no combiner is used. Instead, two separate antennas 502 and 504 are used for transmission and reception, respectively. The antenna 502 is connected to the transmitter 104, and broadcasts the transmitted signal, and the antenna 504 is connected to the power summer 140 and inputs the received signal to the power summer 140. Even though no combiner is used, the transmission antenna 502 is still in close proximity to reception antenna 504, and the transmitted signal can still interfere with the received signal and cause distortion. The interrogator 500 includes a static phase-shifting circuit 106 and the static amplifier 134. Both the static phase and gain shift circuits are similar to those used for the interrogator 100 described in FIG. 1.

Figure 6:
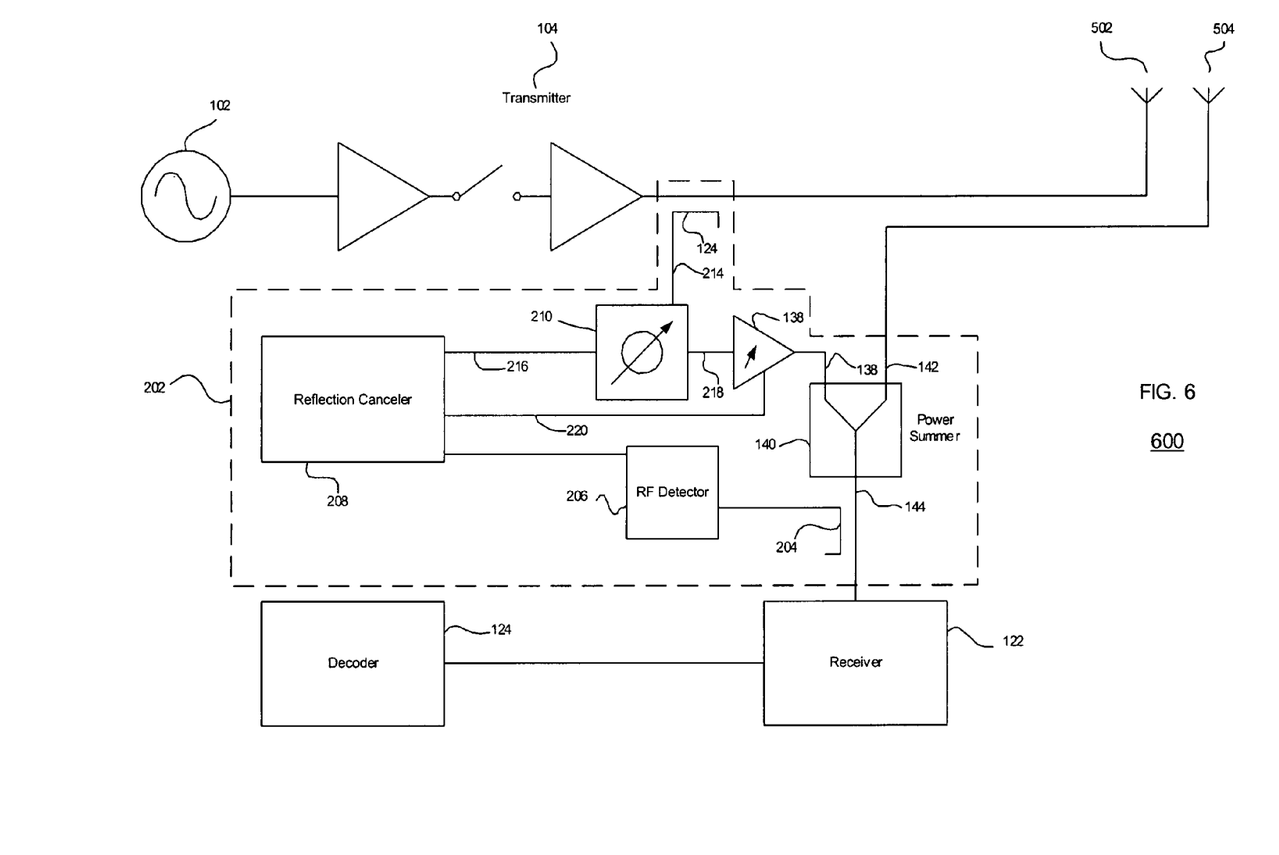
FIG. 6 illustrates an interrogator using separate transmission and reception antennas and a dynamic feedback circuit to remove distortion from a received signal according to a sixth embodiment of the invention.

FIG. 6 illustrates an interrogator using separate transmission and reception antennas and a feedback circuit to remove distortion from a received signal according to a sixth embodiment of the invention. The interrogator 600 includes two separate antennas 502 and 504 similar to those described above regarding FIG. 5. However, the interrogator 600 uses a dynamic feedback circuit 202 described above regarding FIG. 2. As above, the antenna 502 is connected directly to the output of the transmitter 104, and the antenna 504 is connected to an input of the power summer 140. Like the interrogator 200, the interrogator 600 utilizes a dynamic feedback circuit 202 to improve the modification of the sampled signal.

It is understood that other combinations of the various components and circuits described above may also be used. Further, other combiners may be used. Also, the several embodiments of the invention may include other components. For example, the decoder 124 may be connected to a display or other output device to display the identification of the intercepted RFID tags.

Figure 7:
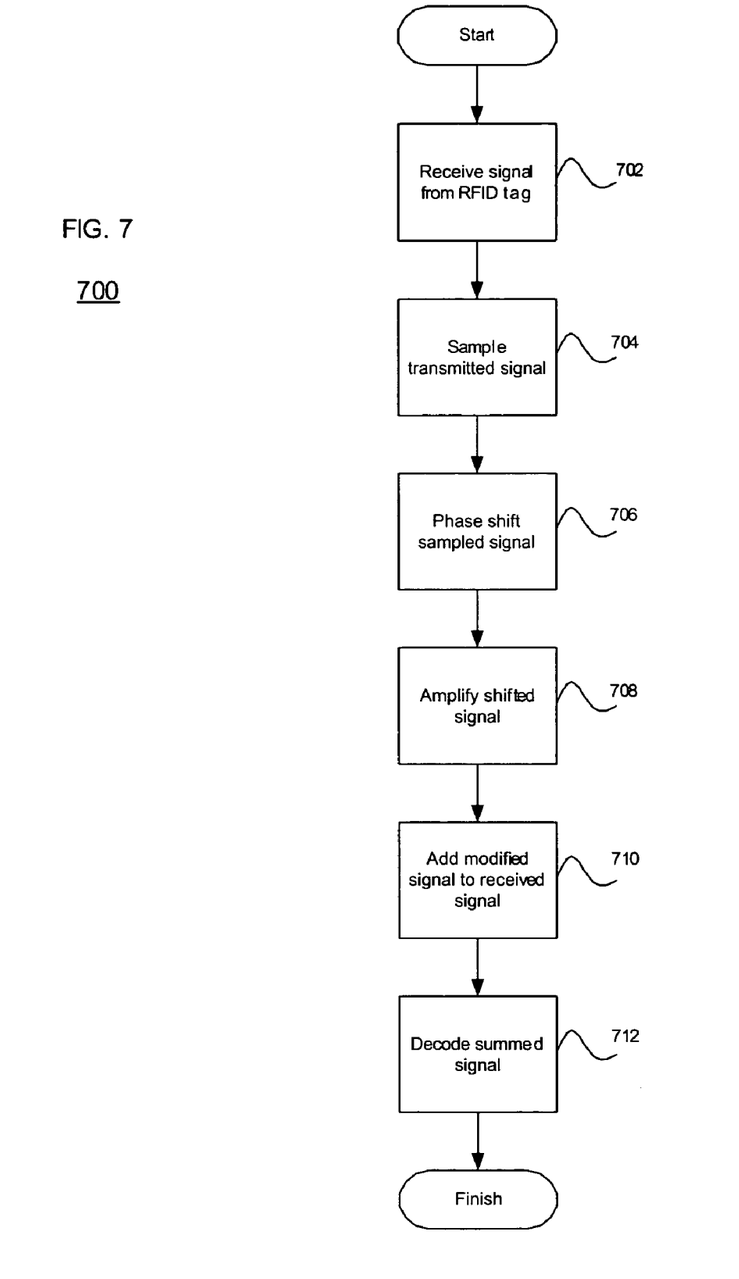
FIG. 7 is a flowchart describing a process for removing distortion from a received signal in an interrogator.

FIG. 7 is a flowchart describing a process for removing distortion from a received signal in an interrogator. The process 700 generally describes receiving and adjusting a signal as described above. In block 702, the received signal is received from an RFID tag. The received signal may be a backscattered signal that has been modified by the RFID tag so that the received signal can be used to identify the RFID tag. In block 704, the transmitted signal is sampled to generate a sampled signal. The sampled signal will be modified and added to the received signal to remove the distortion created by the transmitted signal.

In block 706, the sampled signal is phase shifted to generate a phase shifted signal. The phase shifting may be performed as described above, using either the transmission line 130 or the variable phase shift element 210 as described above. In block 708, the phase shifted signal is amplified to generate a modified signal. The phase shifted signal may be amplified using either the variable attenuator 136 or the voltage controlled gain amplifier 218, as described above.

In block 710, the modified signal is added to the received signal to generate a summed signal. The modified signal has been modified so that it cancels the distortion when added to the received signal. In block 712, the summed signal is decoded. The decoder 124 analyzes the summed signal to determine an identification of the RFID tag from which the received signal originated.

This invention has been described with reference to specific exemplary embodiments thereof. It will, however, be evident to persons having the benefit of this disclosure that various modifications changes may be made to these embodiments without departing from the broader spirit and scope of the invention. The specification and drawings are accordingly to be regarded in an illustrative rather than in a restrictive sense.

What is claimed is:

1. An apparatus comprising:
   a transmitter to transmit a continuous wave (CW) signal to supply radio frequency (RF) energy to power radio frequency identification (RFID) tags, wherein the CW signal is modulated from time to time with an information signal to interrogate the RFID tags in such a wave so as to avoid having to provide separate transmitters to transmit an unmodulated energy frequency and a different modulated signal frequency;
   a first coupler to output a sampled signal from the CW signal generated by the transmitter;
   a phase shifter connected to the first coupler to shift the phase of the sampled signal and output a phase shifted signal such that the phase shifted signal is opposite in phase to an unwanted distortion of a received signal;
   an amplitude adjuster to adjust the phase shifted signal such that the phase shifted signal is opposite in phase and equal in amplitude to the unwanted distortion of the received signal;
   a summer connected to the amplitude adjuster to add the shifted and adjusted signal to the received signal to generate a summed signal to cancel the unwanted distortion from the received signal and to transmit the summed signal to a signal receiver; and
   a circuit to adjust the amplitude adjuster and the phase shifter based on a voltage from an RF detector detecting remaining unwanted distortion reflecting the effectiveness of a distortion cancellation in the summed signal.

2. The apparatus of claim 1, further comprising
   a combiner connected to the summer and the transmitter; and
   an antenna connected to the combiner.

3. The apparatus of claim 2, wherein the combiner comprises
   a first port connected to the transmitter;
   a second port connected to the antenna; and
   a third port connected to the signal receiver.

4. The apparatus of claim 3, wherein the summer is connected in between the signal receiver and the third port.

5. The apparatus of claim 1, further comprising:
   a second coupler connected to the summer to sample the summed signal.

6. The apparatus of claim 2, wherein the combiner comprises a circulator.

7. The apparatus of claim 2, wherein the combiner comprises a directional coupler.

8. The apparatus of claim 1, further comprising a first antenna connected to the signal generator and a second antenna connected to the summer.

9. An interrogator for a radio frequency identification (RFID) system comprising:
   a transmitter to output a transmitted continuous wave (CW) signal to supply radio frequency (RF) energy to power RFID tags, wherein the CW signal is modulated from time to time with an information signal to interrogate the RFID tags in such a way so as to avoid having to provide separate transmitters to transmit an unmodulated energy frequency and a different modulated signal frequency;
   a combiner connected to the transmitter;
   an antenna connected to the combiner:
   a receive port connected to the combiner to receive a received signal, wherein the received signal includes a leaked portion of the transmitted signal;
   a first coupler connected between the transmitter and the combiner to sample the transmitted signal and generate a sampled signal;
   a phase shifter connected to the first coupler to shift the sampled signal and generate a phase shifted signal;
   an amplitude adjuster connected to the phase shifter to adjust the phase shifted signal;
   a summer connected to both the amplitude adjuster and the receive port to add the adjusted and phase shifted signal to the received signal to generate a summed signal to cancel the leaked portion of the transmitted signal;
   a second coupler connected between the summer and a receiver;
   a radio frequency (RF) detector connected to the second coupler to both detect remaining unwanted distortion in both phase and amplitude in the summed signal and to output a first voltage reflecting the effectiveness of the leaked signal cancellation; and
   a reflection canceller to both determine a first amount to phase shift the sampled signal and a second amount to adjust the sampled signal based on the first voltage, and to adjust the phase shifter and amplitude adjuster in response to the first and the second amounts.

10. The interrogator of claim 9, wherein the combiner comprises a circulator.

11. The interrogator of claim 9, wherein the combiner comprises a directional coupler.

12. The interrogator of claim 9, wherein the amplitude adjuster comprises a voltage controller gain amplifier.

13. A method for removing distortion from signals comprising:
    transmitting a continuous wave (CW) signal to constantly supply radio frequency (RF) energy to power radio frequency identification (RFID) tags, wherein the CW signal is modulated from time to time with an information signal to interrogate the RFID tags in such a way so as to avoid having to provide separate transmitters to transmit an unmodulated energy frequency and a different modulated signal frequency;
    receiving a first response signal;
    sampling a second signal to generate a third signal;
    phase shifting and amplitude adjusting the third signal to generate a fourth signal;

adding the fourth signal to the first response signal to generate a fifth signal to remove the distortion from the first response signal;

coupling the fifth signal with an RF detector to detect remaining unwanted distortion in both phase and amplitude in the summed signal and to output a first voltage reflecting the effectiveness of the distortion removal;

determining both a first amount to phase shift a sampled signal and a second amount to adjust the sampled signal based on the first voltage; and adjusting both the phase shifting and amplitude adjusting of the third signal based on the results of the first and second amounts.

14. The method of claim 13, wherein the first response signal is a received signal from a radio frequency identification (RFID) tag.

15. The method of claim 14, wherein the second signal is a transmitted signal from an RFID interrogator.

16. The method of claim 13, wherein phase shifting comprises:

shifting a phase of the third signal 1800 relative to the distortion.

17. The method of claim 16, wherein amplifying comprises:

amplitude adjusting the third signal so that a first amplitude of the fourth signal is equal to a second amplitude of the distortion.

18. The method of claim 13:

wherein adding further comprises generating a fifth signal; and sampling the fifth signal to provide a feedback for the phase shifting and amplitude adjusting.

19. An apparatus for removing distortion in radio frequency (RE) signals comprising:

a signal generator to generate a continuous wave (CWI signal to supply RE energy to power radio frequency identification (RFID) tags, wherein the CW signal is modulated from time to time with an information signal to interrogate the RFID tags in such a way so as to avoid having to provide separate transmitters to transmit an unmodulated energy frequency and a different modulated signal frequency;

a first coupler to output a sampled signal from the CW signal generated by the signal generator;

a phase shifter connected to the first coupler to shift the phase of the sampled signal and output a phase shifted signal wherein the phased shifted signal is opposite in phase to an unwanted distortion of a received signal;

an amplitude adjuster to modify the phase shifted signal such that the modified signal is substantially opposite in phase and equal in amplitude to the unwanted distortion of the received signal;

a summer connected to the amplitude adjuster to add the modified signal to the received signal to generate a summed signal to cancel the unwanted distortion from the received signal;

a second coupler to sample the summed signal;

a first device comprising a RF detector connected to the second coupler to both detect remaining unwanted distortion in both phase and amplitude in the summed signal and to output a first voltage reflecting the effectiveness of the distortion cancellation; and a second device to dynamically adjust, based on the first voltage, the amplitude adjuster by a first amount and to dynamically adjust, based on the first voltage, the phase shifter by a second amount to modify the summed signal based on the first voltage from the first device.

20. The apparatus of claim 19, wherein the signal generator is a transmitter.

21. The apparatus of claim 19, further comprising:

a combiner connected to the summer and the signal generator; and an antenna connected to the combiner.

22. The apparatus of claim 21, wherein the combiner comprises:

a first port connected to the signal generator;

a second port connected to the antenna; and a third port connected to the receiver.

23. The apparatus of claim 22, wherein the summer is connected in between the signal receiver and the third port.

24. The apparatus of claim 21, wherein the combiner comprises a circulator.

25. The apparatus of claim 21, wherein the combiner comprises a directional coupler.

26. The apparatus of claim 19, further comprising a first antenna connected to the signal generator and a second antenna connected to the summer.

27. An interrogator for a radio frequency identification (RFID) system comprising:

a transmitter to output a transmitted continuous wave (CW) signal to supply radio frequency (RF) energy to power RFID tags, wherein the CW signal is modulated from time to time with an information signal to interrogate the REID tags in such a way so as to avoid having to provide separate transmitters to transmit an unmodulated energy frequency and a different modulated signal frequency;

a combiner connected to the transmitter;

an antenna connected to the combiner:

a receive port connected to the combiner to receive a received signal, wherein the received signal comprises a leaked portion of the transmitted signal; and a dynamic feedback circuit configured to sample the transmitted signal and to receive the received signal and to adjust amplitude and phase of a signal derived from the transmitted signal to obtain a modified signal, and to measure remaining unwanted distortion in both phase and amplitude of a summed signal, the summed signal resulting from adding together the modified signal and the received signal, wherein the amplitude and the phase are adjusted based on a single output from an RF detector.

28. The interrogator of claim 27, wherein the combiner comprises one of a circulator and a directional coupler.

29. The interrogator of claim 27, wherein the detector has an input, which drives the single output, and the input samples an output of a summer which sums the received signal and the modified signal.

30. An interrogator as described in claim 27, wherein the dynamic feedback circuit further comprises:

a first coupler connected between the transmitter and the combiner to sample the transmitted signal and generate a sampled signal;

a phase shifter connected to the first coupler to shift the sampled signal and generate a phase shifted signal;

an amplitude adjuster connected to the phase shifter to modify the phase shifted signal whereby a modified signal is opposite in phase and equal in amplitude to the unwanted distortion of the received signal;

a summer connected to both the amplitude adjuster and the receive port to generate the summed signal to cancel the leaked portion of the transmitted signal;

a second coupler connected between the summer and a receiver;

a radio frequency (RF) detector connected to the second coupler to both detect remaining unwanted distortion in both phase and amplitude in the summed signal and to output a first voltage reflecting the effectiveness of the leaked signal cancellation; and a reflection canceller to both determine a first amount to phase shift the sampled signal and a second amount to amplitude adjust the sampled signal based on the first voltage and to dynamically adjust the phase shifter and amplitude adjuster in response to the first and second amounts.

* * * * *